Nov. 11, 1958  S. F. SALAMY  2,859,580
ROTARY REEL POWER MOWER
Filed Nov. 1, 1954  3 Sheets-Sheet 1
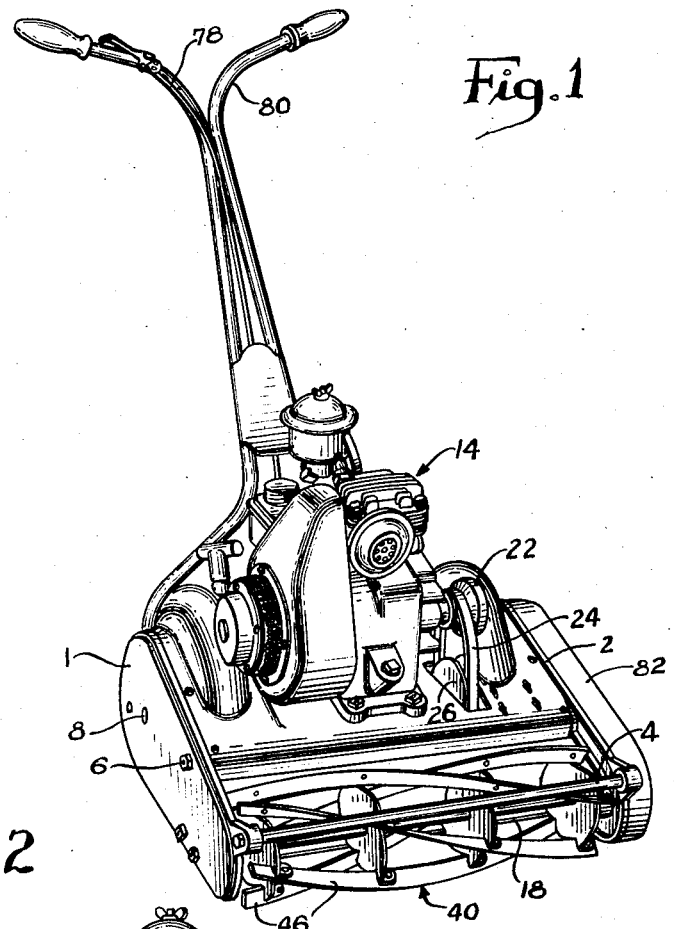
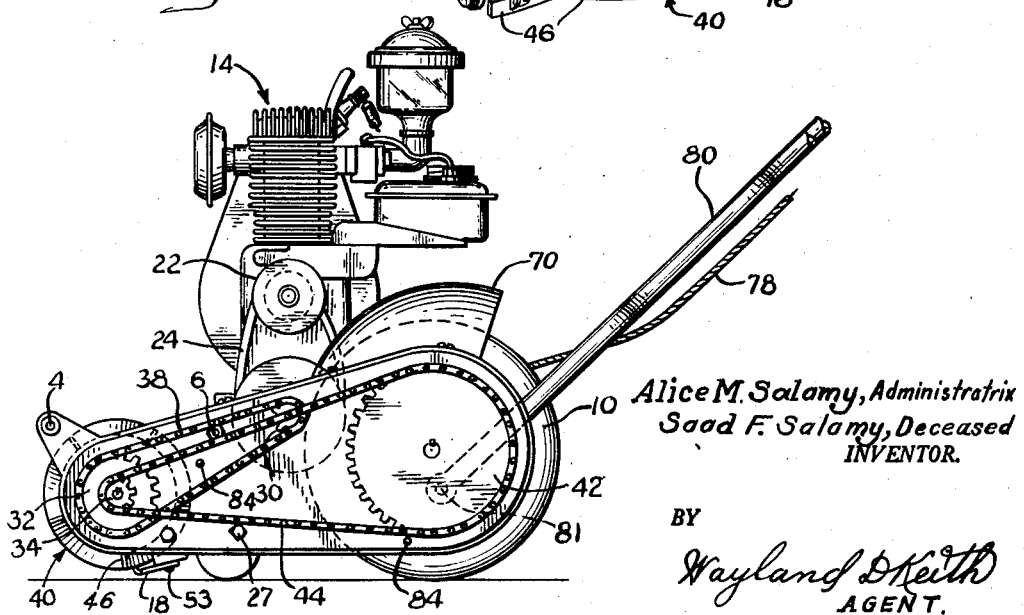
Alice M. Salamy, Administratrix
Saad F. Salamy, Deceased
INVENTOR.
BY
Wayland D Keith
AGENT.

Nov. 11, 1958 S. F. SALAMY 2,859,580
ROTARY REEL POWER MOWER
Filed Nov. 1, 1954 3 Sheets-Sheet 2
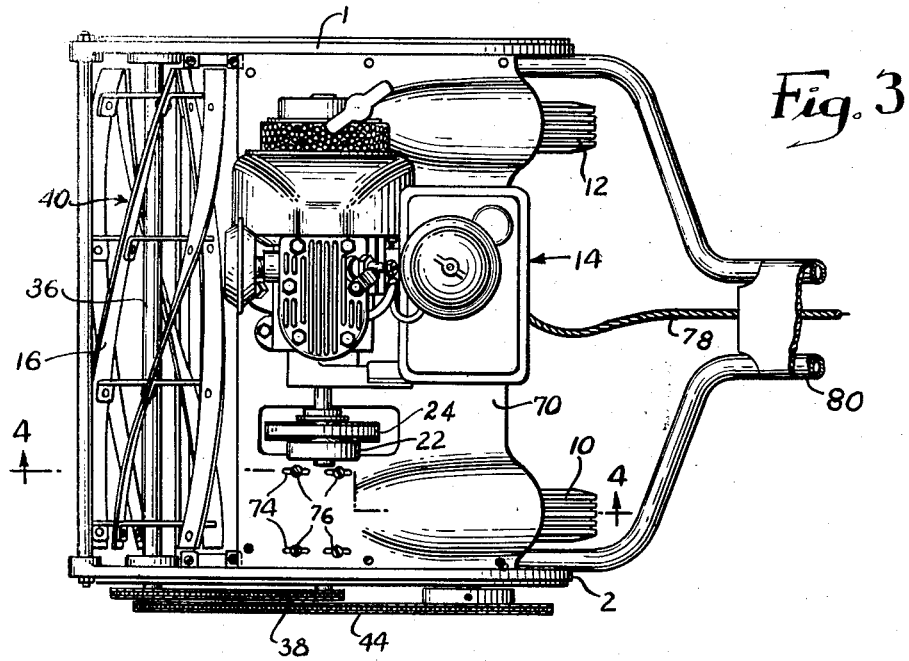
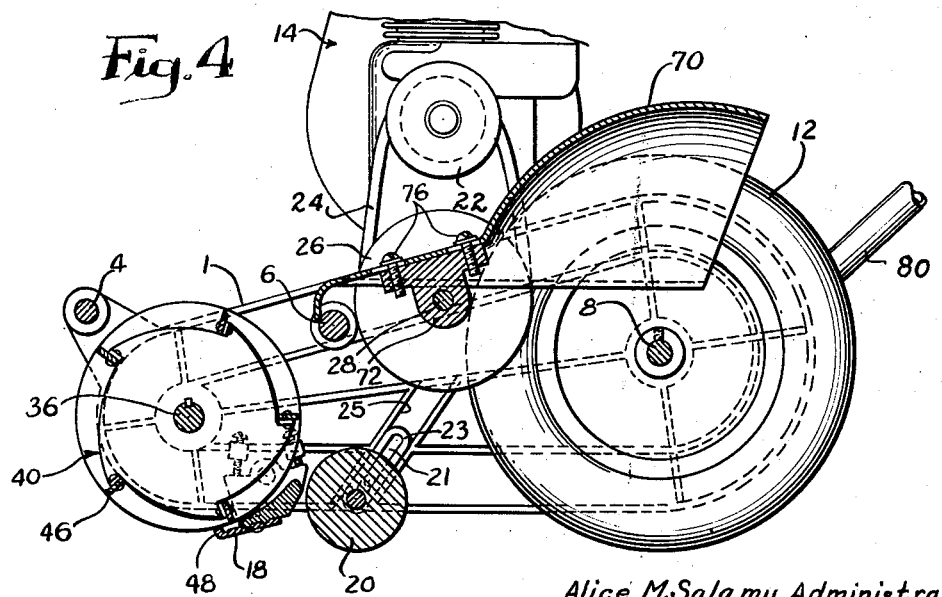
Alice M. Salamy, Administratrix
Saad F. Salamy, Deceased
INVENTOR.
BY
Wayland D. Keith
AGENT.

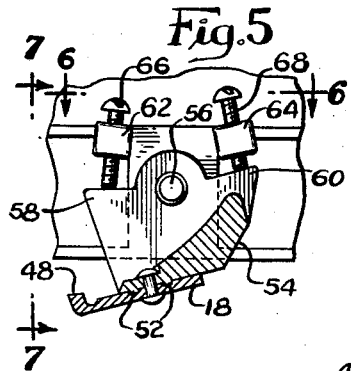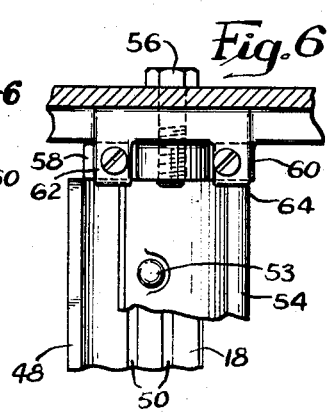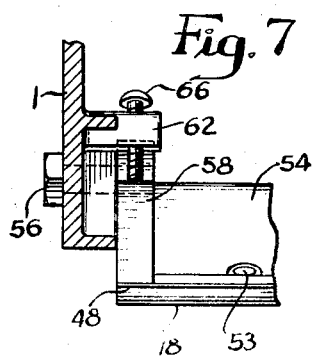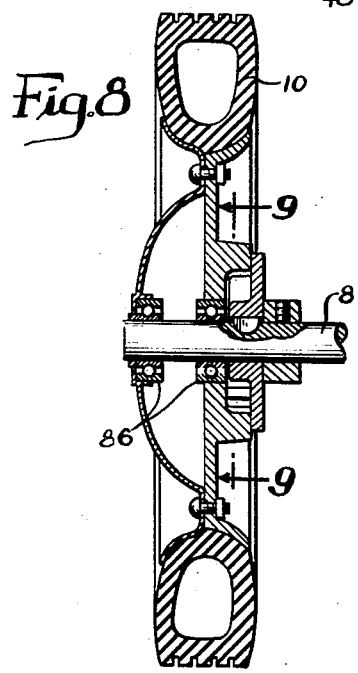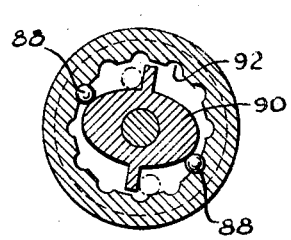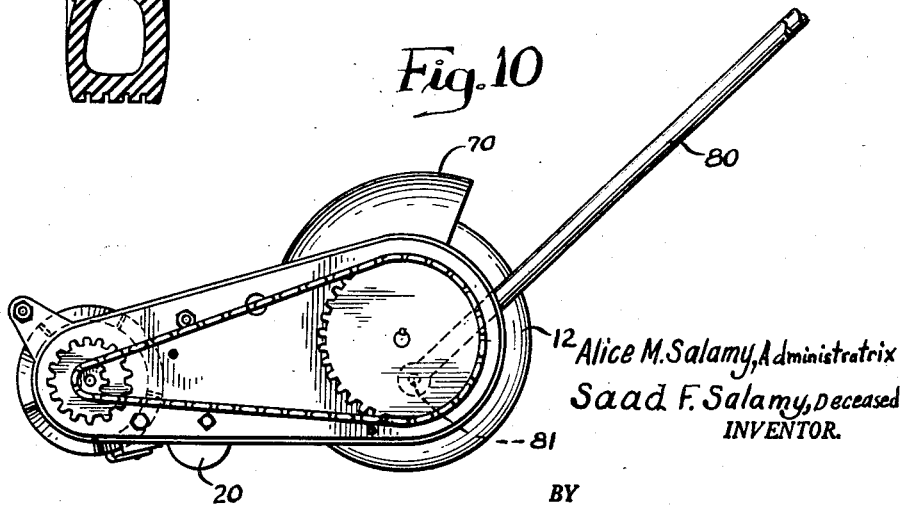

2,859,580
ROTARY REEL POWER MOWER

Saad F. Salamy, deceased, late of Amarillo, Tex., by Alice M. Salamy, administratrix, Amarillo, Tex.

Application November 1, 1954, Serial No. 465,831

1 Claim. (Cl. 56—26)

This invention relates to improvements in lawn mowers of the reel type, which will cut close to walls, walks, shrubs, curbs, or the like, when propelled therealong in one direction and which will cut grass ahead of the wheels thereof, thereby insuring even cutting of the grass.

Various lawn mowers have been proposed heretofore, but these for the most part, have been cumbersome to handle, and did not cut the grass sufficiently close to the curb, wall, walk or the like to obviate the necessity of an auxiliary edging tool or hand trimming.

An object of this invention is to provide a lawn mower, one side of which has a relatively thin reel support plate, which enables the reel to cut grass sufficiently close to walks, walls and the like, as to obviate the necessity of hand trimming.

Another object of the invention is to provide a lawn mower, the cutter bar of which has an up-turned edge which is self sharpening at all times.

Still another object of this invention is to provide a lawn mower which may be readily converted from a manual power to a power mower, or vice versa. The power version of the mower being equipped with a power plant, such as a gasoline engine, an electric motor, or the like and by changing of places with the wheels or readjustment of the ratchet therein, so that the wheels will become traction wheels to pull the mower, or when changed to a manual mower, the reverse process is followed, so a ratchet within the wheels will engage the shaft and enable the reel to be driven by the turning of the wheels.

Yet another object of the invention is to provide a lawn mower which is so designed that the wheels pass over cut grass of the lawn, thereby obviating packed portions of the grass to result in uneven cutting or the leaving of uncut ridges.

A still further object of the invention is to provide a lawn mower that is simple in construction and easy to operate, whether used as a manual or a power mower, and which will do the cutting and trimming at one operation.

With these objects in mind, and others that will manifest themselves as the description proceeds, reference is to be had to the accompanying drawings, in which like reference characters designate like parts in the several views thereof, in which:

Fig. 1 is a perspective view of the power type lawn mower embodying the invention, taken from above and showing a side and the front thereof;

Fig. 2 is a side elevational view of the power lawn mower showing the driving mechanism with the chain housing removed therefrom, and with the handle broken away;

Fig. 3 is an enlarged top plan view of the power drive lawn mower with the handle broken away, and with the chain housing removed to show the details of construction;

Fig. 4 is an enlarged sectional view taken on the line 4—4 of Fig. 3, looking in the direction indicated by the arrows; and showing the manner of adjusting the shear blade, supporting rollers and the chain drive sprocket, with portions of the engine and the handle being broken away;

Fig. 5 is an enlarged fragmentary detail view, partly in section, showing the manner of adjusting the shear blade with respect to the reel;

Fig. 6 is a fragmentary sectional view taken on the line 6—6 of Fig. 5, looking in the direction indicated by the arrows;

Fig. 7 is a fragmentary sectional view taken on the line 7—7 of Fig. 5, looking in the direction indicated by the arrows;

Fig. 8 is an enlarged elevational view with parts broken away and shown in section of one of the drive wheels;

Fig. 9 is a sectional view taken on the line 9—9 of Fig. 8, showing the ball ratchet mechanism; and Fig. 10 is a side elevational view of the above mentioned lawn mower, but with the housing and power unit removed, and also with the power drive belt and chain removed for manual operation.

With more detailed reference to the drawings the numeral 1 designates one of the side frame plates and the numeral 2 the opposite side frame plate, which plates 1 and 2 are bolted together in spaced relation by means of spacer bars 4 and 6, which bars are shouldered to maintain the side frame plates in rigid spaced relation. An axle 8 extends from side to side between the side frame plates 1 and 2 and is journaled therein and has drive wheels 10 and 12 mounted thereon. The wheels are preferably of a structure such as indicated in Figs. 8 and 9, wherein a ratchet is provided so that the wheels may be used as power drive wheels when used with the power unit, such as an engine which is designated generally at 14. The engine and drive mechanism is so designed as to rotate the drive wheels 10 and 12 at the correct speed to pull the mower along while a cutting reel 16 is driven at a higher rate of speed so as to cut the grass against shear blade 18 positioned forward of the roller 20.

The power type lawn mower has a conventional engine, designated generally at 14, and which has a conventional, centrifugal automatic type clutch 22 thereon so when the engine gains sufficient speed, the clutch will tighten V-belt 24 so as to rotate pulley 26 which is fixed to shaft 28. The shaft 28 has a small drive pinion sprocket 30 secured thereto on the outside of frame plate 2, as will best be seen in Figs 2 and 3. Other sprockets 32 and 34 are fixed to the reel shaft 36 so the chain 38 will drive the reel, which reel is designated generally at 40, when the engine 14 gains sufficient speed to cause the clutch 22 to engage belt 24. The sprocket 42 is fixed to axle 8 and a chain 44 extends between sprockets 34 and 42 so as to drive wheels 10 and 12 to move the mower over the terrain under the power of the engine 14.

The reel 40 preferably has multiple spiral blades 46 thereon, as will best be seen in Figs. 1, 2, 3, and 4, which spiral blades are engageable with a shear blade 18, which shear blade has an up-turned lip 48 which forms a cutting edge to complementarily engage the cutting edge of spiral blades 46. The shear blade 18 has a pair of longitudinal grooves 50 therein which complementarily engage a pair of ribs 52 formed on a shear blade support bar 54. Rivets 53 pass through the shear blade 18 and shear blade support bar 54 so as to secure the shear blade to the support bar. The shear blade support bar is mounted at each end on a pivot member 56. The support bar has out-turned lugs 58 and 60 on each side of pivot member 56.

Threaded lugs 62 and 64 are mounted on the inside of each of the side frame plates 1 and 2. Set screws 66 and 68 threadably engage lugs 62 and 64, respectively, which set screws extend down against the respective shoulders 58 and 60 on each end of shear blade support bar 54 so as to rock bar 54 about pivot pin 56 to cause engagement of up-turned lip 48 with the spiral blades 46 on the reel, to the proper degree.

A cover 70 extends between and is secured to side frame plates 1 and 2, which cover forms a mounting base for engine 14, as well as for bearing 72 in which shaft 28 is journaled. The cover 70 is slotted, as indicated at 74 and bolts 76 pass through these slots to threadably engage bearing 72 so as to enable the tightening of chain 38.

A control wire 78 extends from the engine 14 to the upper end of the handle 80 so as to enable the control of the speed of the motor as the cutting of the grass progresses. A chain housing 82 is secured to a side frame plate 2 by means of bolts 84 so as to protect the mechanism from becoming entangled in weeds and the like, and against the entrance of foreign matter, and to protect the operator or children from being caught in the rapidly moving chain and sprockets.

The drive wheels 10 and 12 are journaled on the axle 8 as by anti-friction bearings 86 and have balls 88 and cam ratchet arrangement 90, the cam of which is mounted on the shaft so as to urge the balls into pockets 92 upon centrifugal motion of the cam in one direction, so by arranging the wheels so that the balls 88 are in one quadrant of the cam, the wheels can be used as traction wheels to be driven by engine 14. However, by arranging the balls 88 in the other quadrants of the cam, the mower may be converted into a manually operated mower and the wheels will drive the chain 44 to operate the reel 40. In this manner, it will be readily appreciated, that the mower can readily be changed from power operation to manual operation, and when so changing, the engine 14 may be removed, as indicated in Fig. 10, however, the removal of the engine is not necessary except for the purpose of lightening the mower, when it is to be manually operated. The mower may then be pushed by means of handle 80 in the usual manner. The handle 80 is adapted to pivot about pivot member 81, as will best be seen in Figs. 2 and 10.

The roller 20 is provided to hold the up-turned lip 48 a spaced distance above the ground, this, however is adjustable within in the range of slot 21 formed within bracket 23, which bracket slides within a groove 25 in the respective side frame plates 1 and 2, which bracket is held in secure relation by lock bolt 27.

It will be appreciated that the cutting reel 40 extends between side frame plates 1 and 2 to a point near the inner surface thereof and that the side frame plates are made of relatively thin material with inwardly protruding bearing mounts so that the cutting blades 46 are so near the outer surface of the side frame plates that the grass is cut the entire width of the mower, which means that it will be cut close to walls, curbs, shrubs, hedges and the like, which will eliminate the use of an auxiliary tool for trimming, or the necessity for hand trimming. The plate 1 is preferably positioned on the right hand side of the mower, since the majority of individuals who would be operating the machine are right handed, and the machine can thus be guided very close to walks, shrubs, and the like from the right hand side of the operator. The chain housing 82 is preferably on the left side and houses the chains that are on the outside of side frame plate 2, thereby enabling the cutting swath to be substantially the full width between the side frame plates which will be the width of the cutting reel, which makes for a wider cutting reel than is possible with mowers utilizing drive chains between the side frame plates.

The reel 40 is positioned at the forward end of the side frame members 1 and 2, so that the grass being cut can be mowed close to shrubs and the like without interference from the frame work.

With the wheels being positioned between the side frame plates 1 and 2, and within the width of the cutting reel 40, the wheels will pass over the mowed grass, thereby enabling the entire surface of the grass to be cut without the wheels pressing down the grass before it can be mowed, as would be the case where wheels are on the outer side of the side frame plates 1 and 2.

While the mower has been illustrated and described in some detail both for power and for manual operation, it is to be understood that changes may be made in the minor details of construction without departing from the spirit of the invention or the scope of the appended claim.

Having thus clearly shown and described the invention, what is claimed as new and desired to secure by Letters Patent is:

In a lawn mower having a pair of spaced apart, relatively thin side frame plates, at least one of which has a shoulder on the outer portion thereof, an axle shaft extending transversely between said side frame plates near the rear ends of said plates and being journaled therein and having one end of said shaft extending through one of said side plates, a traction wheel mounted on said axle shaft within and adjacent each of said side frame plates, bars extending between said side frame plates and holding said side frame plates a fixed distance apart, a reel shaft extending transversely between said side frame plates and being journaled therein near the forward ends thereof, with one end of said reel shaft extending through the same side plate through which the axle shaft extends, a cutting reel, having blades thereon, mounted on said reel shaft between said side frame plates and extending substantially the entire distance therebetween, the blades of said reel extending forward of said side frame plates, a complementary shear bar mounted between the lower sides of said side frame plates and being adjustably secured thereto near the forward ends thereof, which bar extends substantially the distance between said side frame plates and is in complementary contact relation with the blades of said cutting reel when said reel is rotated, a cover member secured to and extending between said side frame plates, which cover extends forward into close proximity with said reel, said cover plate having a down-turned lip portion on the forward end thereof, said cover member extending rearwardly and enclosing at least the top portion of said wheels and forming a power means mounting plate, power means mounted on said cover plate, said power means having a shaft extending outward therefrom, clutch means mounted on said shaft, a counter-shaft adjustably mounted on said cover plate, a V-belt pulley mounted on said clutch of said power means, a V-belt pulley mounted on said counter-shaft in aligned, driving relation with respect thereto, said counter shaft extending through the same side plate through which said axle shaft extends, a sprocket on the outer end of said counter-shaft immediately adjacent said side frame plate, a sprocket of larger diameter than said first mentioned sprocket, fitted on said reel shaft and being secured thereto in aligned, driving relation with said sprocket on said counter-shaft, a third sprocket, which sprocket is mounted on and secured to said reel shaft, a fourth sprocket, which sprocket is mounted on and attached to said axle shaft, and which fourth sprocket is of a larger diameter than said third sprocket on said reel shaft, and being in aligned, driving relation with respect thereto, a transmission chain extending around said first sprocket and said second sprocket in driving relation, a further transmission chain extending around said third sprocket and said fourth sprocket in driving relation, and a cup-shaped cover complementarily fitted on said shoulder and being attachably secured to the outer portion of said side plate adjacent said sprockets so as to enclose said chains.

References Cited in the file of this patent

UNITED STATES PATENTS

| | | |
|---|---|---|
| 1,348,471 | Aspinwall | Aug. 3, 1920 |
| 1,899,181 | Carolus | Feb. 28, 1933 |
| 2,218,865 | Banta | Oct. 22, 1940 |
| 2,490,169 | Swahnberg | Dec. 6, 1949 |
| 2,528,041 | Davis | Oct. 31, 1950 |
| 2,586,738 | Sullivan | Feb. 19, 1952 |
| 2,741,890 | Woody | Apr. 17, 1956 |